United States Patent
Zucca et al.

(10) Patent No.: US 10,007,448 B2
(45) Date of Patent: Jun. 26, 2018

(54) MULTIPLE HIERARCHIES OF SNAPSHOTS

(71) Applicant: VMware, Inc., Palo Alto, CA (US)

(72) Inventors: Michael Zucca, Somerville, MA (US);
Keith Farkas, San Carlos, CA (US);
Joanne Ren, Cupertino, CA (US);
Mayank Rawat, Cupertino, CA (US);
Christos Karamanolis, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 229 days.

(21) Appl. No.: 14/838,629

(22) Filed: Aug. 28, 2015

(65) Prior Publication Data
US 2017/0060449 A1    Mar. 2, 2017

(51) Int. Cl.
G06F 3/06    (2006.01)

(52) U.S. Cl.
CPC .......... *G06F 3/0619* (2013.01); *G06F 3/0647* (2013.01); *G06F 3/0673* (2013.01)

(58) Field of Classification Search
CPC .... G06F 3/0619; G06F 2201/84; G06F 3/065;
G06F 3/0673; G06F 3/0647; G06F 11/1456; G06F 2201/815; G06F 3/064; G06F 11/1469; G06F 11/2094; G06F 3/0608; G06F 11/1402; G06F 11/1446; G06F 3/0665
See application file for complete search history.

(56) References Cited

U.S. PATENT DOCUMENTS

| | | | |
|---|---|---|---|
| 7,373,366 B1* | 5/2008 | Chatterjee | G06F 11/1451 |
| 8,819,362 B1* | 8/2014 | Duprey | G06F 11/2069 |
| | | | 711/161 |
| 2007/0112893 A1* | 5/2007 | Okada | G06F 11/1471 |
| 2007/0174569 A1* | 7/2007 | Schnapp | G06F 3/0604 |
| | | | 711/162 |
| 2016/0320978 A1* | 11/2016 | Barve | G06F 3/065 |
| 2017/0083405 A1* | 3/2017 | Basham | G06F 11/1451 |

* cited by examiner

*Primary Examiner* — Zhuo Li
(74) *Attorney, Agent, or Firm* — Patterson & Sheridan, LLP

(57) ABSTRACT

A method for restoring a data volume using incremental snapshots of the data volume includes creating a first series of incremental snapshots according to a first predefined interval. The method further includes creating a second series of incremental snapshots according to a second predefined interval that is an integer multiple of the first predefined interval. The method also includes receiving a request to restore the data volume to a point-in-time. The method further includes restoring the data volume to the point-in-time using none or some of the snapshots in the first series that were created at or prior to the point-in-time, and all of the snapshots in the second series that were created at or prior to the point-in-time.

20 Claims, 9 Drawing Sheets

MULTIPLE HIERARCHIES OF SNAPSHOTS

BACKGROUND

In virtual computing environments, backups can be created by taking snapshots of virtual disks or other data volumes. A snapshot preserves the contents of the virtual disk or data volume at a certain point-in-time. When a series of snapshots is created, for storage efficiency, subsequently created snapshots only capture the incremental changes from the prior snapshots. More specifically, as a virtual machine (VM) issues writes after a snapshot has been taken, the system software records the write data until a subsequent snapshot is taken and all such recorded write data are captured as contents of the subsequent snapshot.

Snapshots may be stored locally or in a remote site for disaster recovery purposes. Snapshots may also be stored as a combination of local and remote copies. The frequency of taking snapshots is driven by a user-specified recovery point objective (RPO). In the context of disaster recovery, RPO essentially specifies the maximum time skew permitted between the primary and secondary copies of the data. For example, a one minute RPO means that the data at the secondary site cannot be more than one minute out of date with respect to the data at the primary site. For critical applications, the RPO is much smaller than normal and thus the snapshots will need to be taken at a higher frequency. In addition, when the data transmission time from the protected site and the recovery site is considered, the frequency of snapshots will need to be increased even more.

Increasing the frequency of snapshots has associated costs. The obvious costs are increased storage costs at the recovery site and increased network usage. Another cost is increased read latency in situations where reads are performed on the snapshots, e.g., during disaster recovery.

DETAILED DESCRIPTION

Embodiments provide a method of maintaining multiple hierarchies of snapshots at different time granularities (for example, a "coarse grain" series of snapshots and a "fine grain" series of snapshots). A snapshot series may consist of N hierarchies, where the granularity of the (K+1)th hierarchy ($1 \leq K < N$) is finer than the granularity of the Kth hierarchy. Snapshots may be taken of virtual disks and other storage entities. While many of the embodiments described herein use virtual disks as an example, the methods and systems described below also apply to non-virtualized environments and other storage entities. For example, snapshots may be taken of storage objects, data volumes, file systems, files, and the like.

Figure 1:
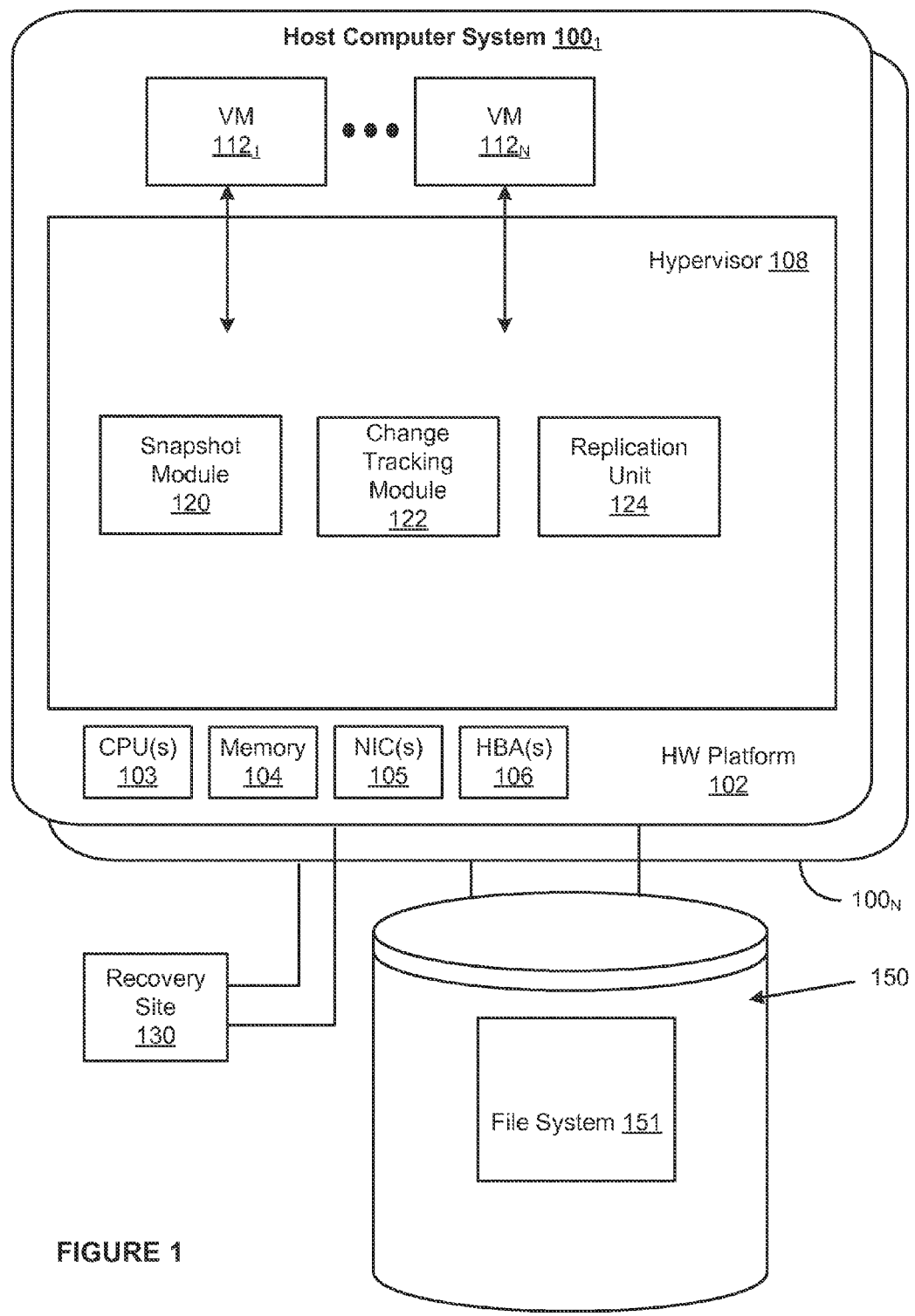
FIG. 1 is a computer system having an operating system that maintains multiple hierarchies of snapshots.

FIG. 1 is a computer system, shown as host computer system $100_1$, having virtualization software, referred to herein as hypervisor 108. Host computer system $100_1$ may be constructed on a conventional, typically server-class, hardware platform 102, and includes one or more central processing units (CPUs) 103, system memory 104, one or more network interface controllers (NICs) 105 that connect host computer $100_1$ to a network, and one or more host bus adapters (HBAs) 106 that connect host computer 102 to a persistent storage unit, illustrated herein as storage device 150. Persistent storage may be provided locally in host computer $100_1$, by a storage array in a storage area network, or by a networked-attached storage device through the network. Other host computer systems up to $100_N$ comprise similar components as those illustrated for host computer system $100_1$.

As further shown in FIG. 1, hypervisor 108 is installed on top of hardware platform 102 and supports the execution of virtual computing instances. In the embodiment illustrated herein, the virtual computing instances are virtual machines (VMs) $112_1$-$112_N$. These virtual machines may each have an associated virtual disk provisioned in storage device 150. Input-output operations (IOs) issued by the VMs are processed through IO stack (not shown) configured in hypervisor 108.

Snapshot module 120 facilitates snapshots for host computer system $100_1$. Snapshots preserve the contents of the virtual disk at a certain point-in-time. Snapshot module 120 manages multiple hierarchies of snapshots in this embodiment, wherein the snapshots in the different hierarchies are taken at different predefined intervals, as described in further detail below. A user can set the number of hierarchies and the predefined intervals, or these values can be determined automatically by an RPO, available system resources, etc. Snapshot module 120 also recovers the state of the virtual disk at a selected point-in-time, as described in further detail below.

Change tracking module 122 records locations on disk that are written to, subsequent to a snapshot. The change tracking module 122 accumulates updates up until the snapshot is taken. When the next snapshot is taken, the accumulated updates may be transmitted to at a remote location, such as recovery site 130, and/or maintained locally.

Replication unit 124 sends the accumulated changes for each snapshot to recovery site 130. Recovery site 130 allows a virtual machine's persistent state to be recovered in the case of a storage failure at the protected site, for example. The changes are stored in the multiple snapshot hierarchies, each hierarchy comprising a sequence of delta disks. When snapshot module 120 takes a snapshot at a point-in-time, replication unit 124 creates a delta disk in the appropriate hierarchy at recovery site 130, and copies the accumulated changes into the delta disk. In other embodiments, snapshots may be stored locally or as a combination of local and remote copies.

The various terms, layers and categorizations used to describe the components in FIG. 1 may be referred to differently without departing from their functionality or the spirit or scope of the invention.

Figure 2:
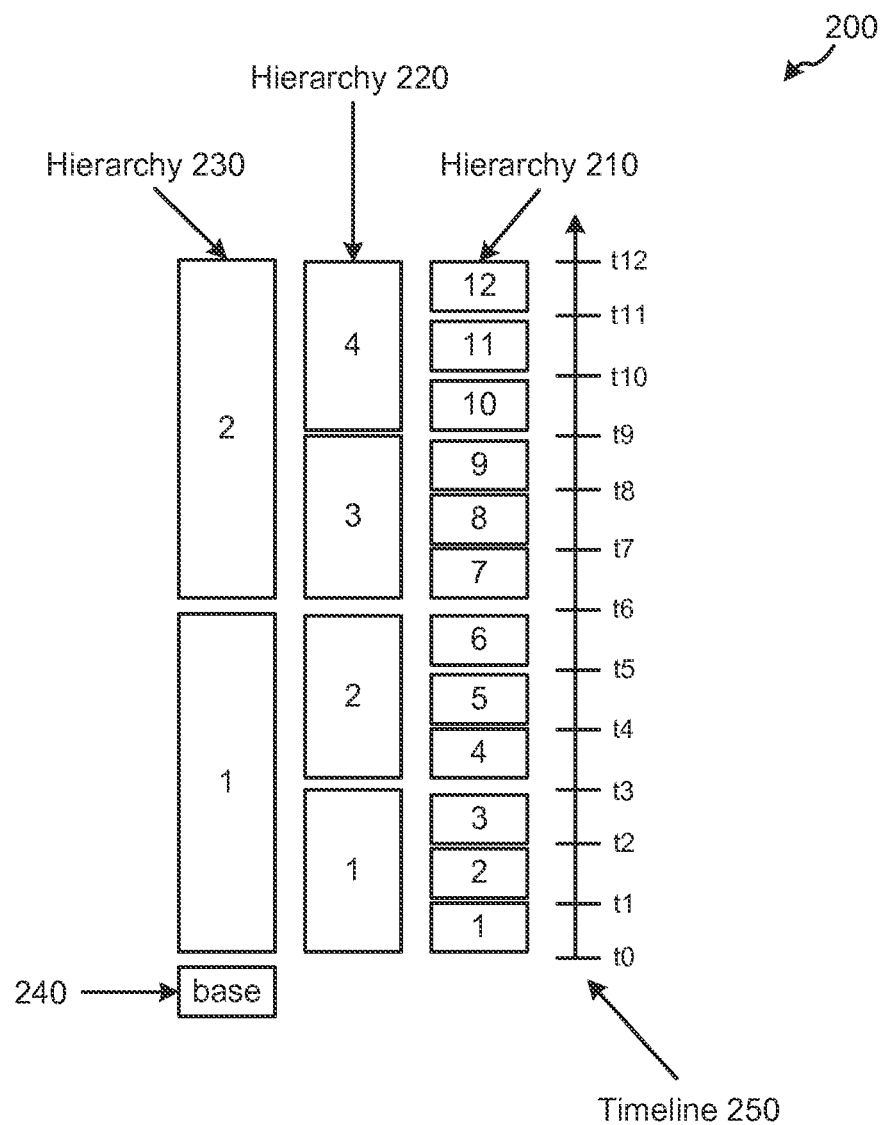
FIG. 2 illustrates a representation of a 3-hierarchy snapshot series.

FIG. 2 illustrates a representation of a 3-hierarchy snapshot series 200 in accordance with one embodiment of the invention. Hierarchies 210, 220, and 230 are illustrated. Any number of hierarchies greater than one may be used in other embodiments. In various embodiments, snapshots may be taken of virtual disks, storage objects, data volumes, file systems, files, and the like.

According to embodiments, a snapshot is taken at a point-in-time. FIG. 2 illustrates a timeline 250 with t0, t1, . . . , t12 as the points-in-time at which one or more snapshots are taken. As a way to distinguish between the snapshot series of different time granularities, the fine grain snapshot is referred herein as a fine-grain (FG) snapshot, the coarsest grain as the coarse-grain (CG) snapshot, and the one in the middle as a middle-grain (MG) snapshot. In the embodiments, described herein, snapshots are incremental snapshots and thus an FG snapshot taken at time t6 stores only the changes in the virtual disk between time t5 and time t6. Likewise, an MG snapshot taken at time t6 stores only the changes in the virtual disk between time t3 and time t6, and a CG snapshot taken at time t6 stores only the changes in the virtual disk between time t0 and time t6.

In the example illustrated in FIG. 2, the granularity of the fine grain hierarchy 210 is three times the granularity of the middle grain hierarchy 220. The granularity of the middle grain hierarchy 220 is two times the granularity of the coarsest grain hierarchy 230. Three snapshots in the fine grain hierarchy 210 map to one snapshot in the middle grain hierarchy 220. If the fine grain snapshots are taken every five minutes, the middle grain snapshots are taken every 15 minutes, and the coarsest grain snapshots are taken every 30 minutes. Therefore the predefined interval for the fine grain hierarchy is five minutes, the predefined interval for the middle grain hierarchy is 15 minutes, and the predefined interval for the coarsest grain hierarchy is 30 minutes.

After a snapshot is taken at t0, all locations of subsequent writes to the virtual disk are tracked by change tracking module 122. A base disk (also known as a base image) 240 represents the contents of the virtual disk at t0 and these contents are copied to a remote location. If the RPO is designated as N minutes, it is required for the entire contents of the virtual disk at t0 to be copied into base disk 240 within N minutes of t0. In order to achieve this, it should be recognized that copying of the contents of the virtual disk may be initiated well before time t0.

Figure 3:
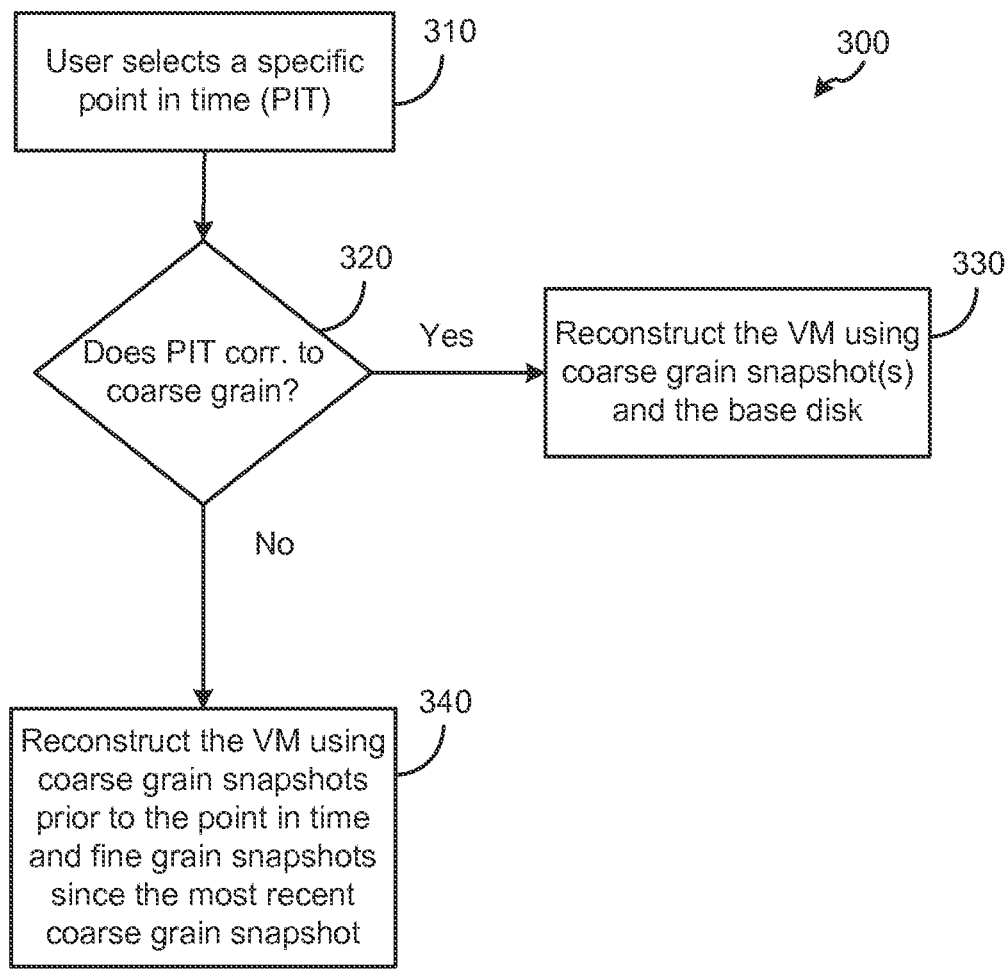
FIG. 3 is a flow diagram that illustrates a method of recovering a virtual disk.

A user may want to recover a virtual disk or other data volume to a particular point-in-time, tx, or perform a read from that virtual disk. To reconstruct the virtual disk from the snapshots, the changes from multiple snapshots may need to be collected. Multiple hierarchies allow read operations to be completed more quickly than with a single hierarchy snapshot structure. FIG. 3 is flow diagram that illustrates a method 300 of recovering a virtual disk or other data volume. First, at step 310, a user selects a specific point-in-time, tx. At step 320, the snapshot module 120 examines the snapshot hierarchies of FIG. 2 to see if a coarse grain snapshot was taken at this time. If the point-in-time corresponds to a coarse grain snapshot, the method proceeds to step 330, where the snapshot module 120 reconstructs the VM using the changes corresponding to the coarse grain snapshot or snapshots and the base disk. As noted above, these changes are stored in delta disks. Because there are fewer coarse grain snapshots at a given point-in-time than fine grain snapshots, recreating the VM using the coarse grain snapshots is faster than using fine grain snapshots.

If the point-in-time does not correspond to a coarse grain snapshot, the method proceeds to step 340. At step 340, snapshot module 120 reconstructs the VM using changes corresponding to coarse grain snapshots previous in time to that fine grain snapshot, along with the changes corresponding to the fine grain snapshots since the most recent coarse grain snapshot. As an example, if the user had chosen time t5 illustrated in FIG. 2, snapshot module 120 would reconstruct the VM using changes from fine grain snapshots 4 and 5 and middle grain snapshot 1. Therefore a system with more than one hierarchy provides a desired RPO while reducing read latency when utilizing the hierarchies.

Restoring a data volume to a point-in-time can comprise creating a redo log for accepting write operations in one embodiment. Contents of the snapshots in the first series that were created at or prior to the point-in-time and after the time of creating the most recent one of the snapshots in the second series that were created at or prior to the point-in-time are copied. Read operations are directed first to the redo log and then in time order, from most recent to least recent, to each of the snapshots in the second series that were created at or prior to the point-in-time, and then to the base disk (base image) of the data volume.

Restoring a data volume to a point-in-time could also comprise creating a redo log for write operations and directing read operations first to the redo log. Then, in time order, read operations are directed from most recent to least recent, to each of the snapshots in the first series that were created at or prior to the point-in-time and after the time of creating the most recent one of the snapshots in the second series that were created at or prior to the point-in-time, and then to the snapshots in the second series that were created at or prior to the point-in-time, and then to the base disk (base image) of the data volume.

Figure 4:
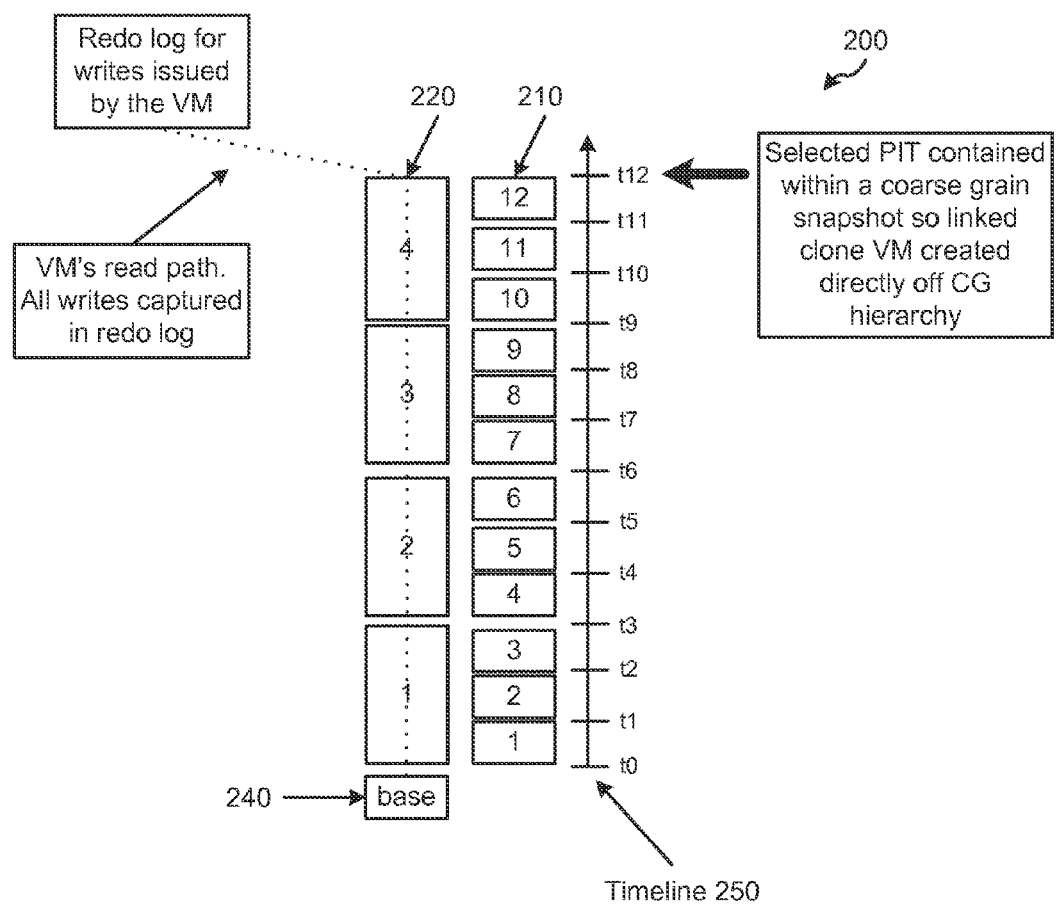
FIG. 4 illustrates an example recovery where the selected snapshot has a matching coarse grain point-in-time.

FIG. 4 illustrates an example recovery where the selected snapshot has a matching coarse grain point-in-time. As shown, a time t=60 minutes was chosen. This time corresponds to coarse grain snapshot 4. The recreated VM can be created using only the coarse grain hierarchy 220.

Figure 5A:
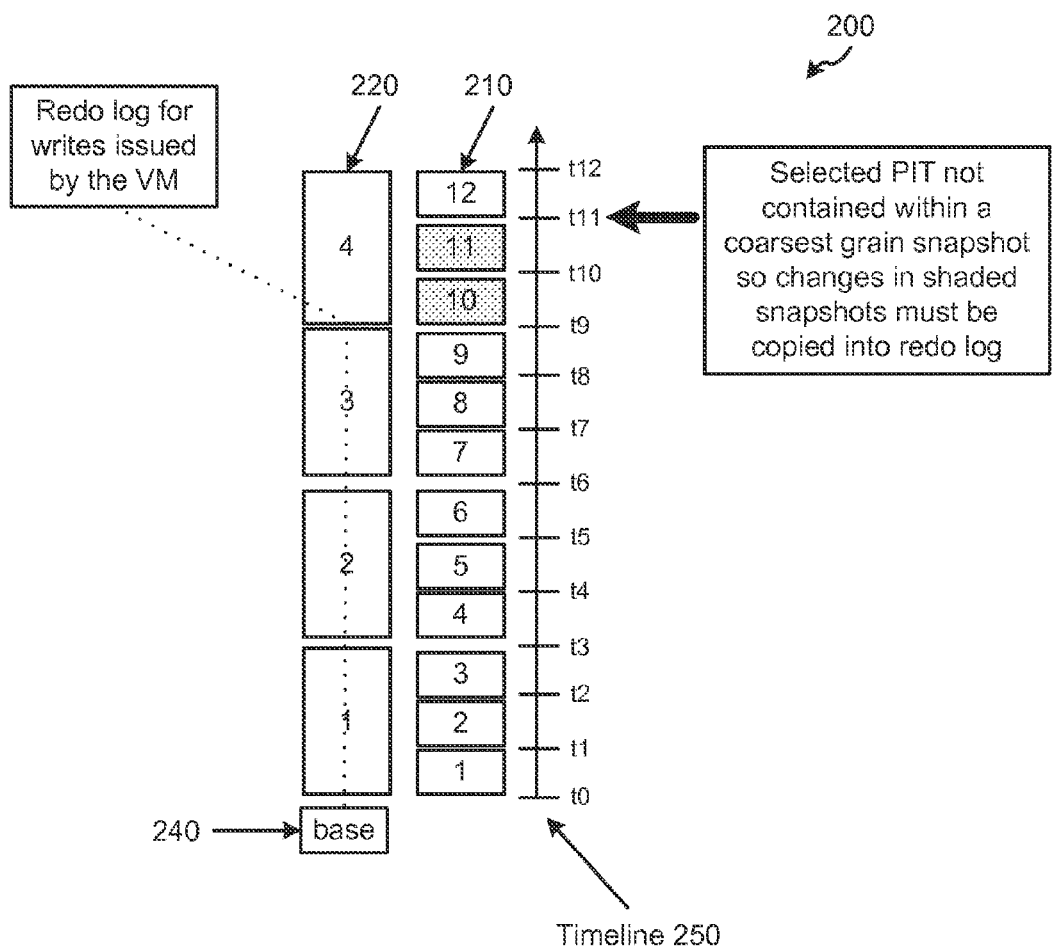
FIG. 5A illustrates an example recovery where the selected point-in-time is not contained within a coarse grain snapshot.

FIG. 5A illustrates one embodiment of an example recovery where the selected point-in-time is not contained within a coarse grain snapshot. For example, if time t=55 minutes, corresponding to fine grain snapshot 11, was chosen, some data copying is performed to recreate the VM at the chosen point-in-time. The changes corresponding to fine grain snapshots 10 and 11 must be combined with the changes corresponding to coarse grain snapshot 3, 2, and 1 to recreate the VM. In this example, the multiple hierarchy structure allows the recreation of this VM at the selected point-in-time by combining the changes from five snapshots. Were a single hierarchy used instead (such as the fine grain hierarchy only), 11 snapshots would have to be traversed to recreate the VM. Therefore the multiple hierarchy structure reduces latency.

Figure 5B:
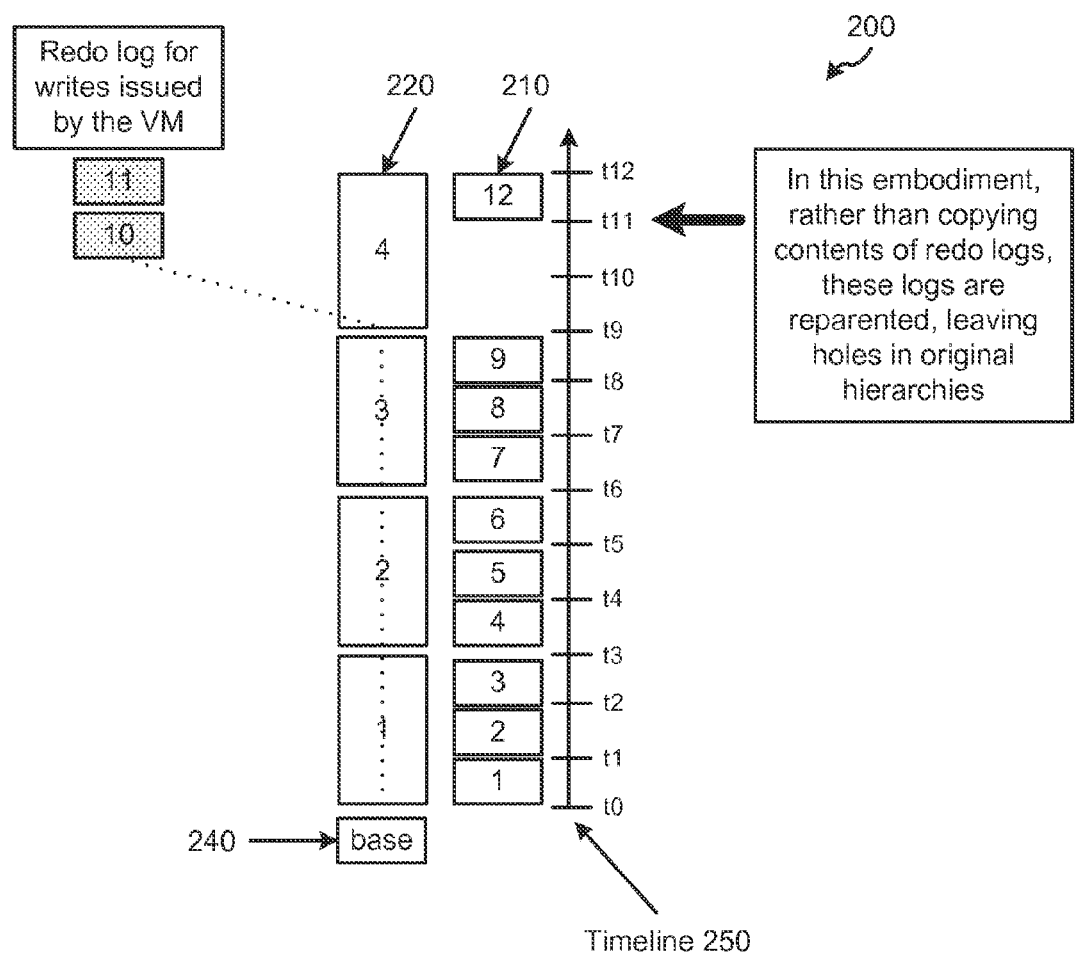
FIG. 5B illustrates another example recovery where the selected point-in-time is not contained within a coarse grain snapshot.

FIG. 5B illustrates another embodiment of an example recovery where the selected point-in-time is not contained within a coarse grain snapshot. For example, if time t=55 minutes, corresponding to fine grain snapshot 11, was chosen, rather than copying the data from the fine-grain snapshots into the redo log, the fine-grain snapshots could be temporarily reparented as illustrated. That is, fine-grain snapshots 10 and 11 are disassociated from their parent in hierarchy 210 and associated with (i.e., linked to or pointed to) a parent in hierarchy 220 (such as snapshot 3, as shown). This reparenting would leave holes in the original hierarchies where the snapshots were located, as shown by the holes above snapshot 9 in hierarchy 210. After the VM image has been created, these "borrowed" snapshots are returned to the original hierarchies (hierarchy 210, in this example). An alternative solution is to recreate the borrowed snapshots by creating two new delta disks and copying the changes from the borrowed snapshots into each one's respective copy.

In some embodiments, the points in time affected by the borrowed snapshots are marked as invalid. In that case, those points in time could no longer be retrieved, nor could any points in time that require the contents of the snapshot at one of those points in time.

Figure 6:
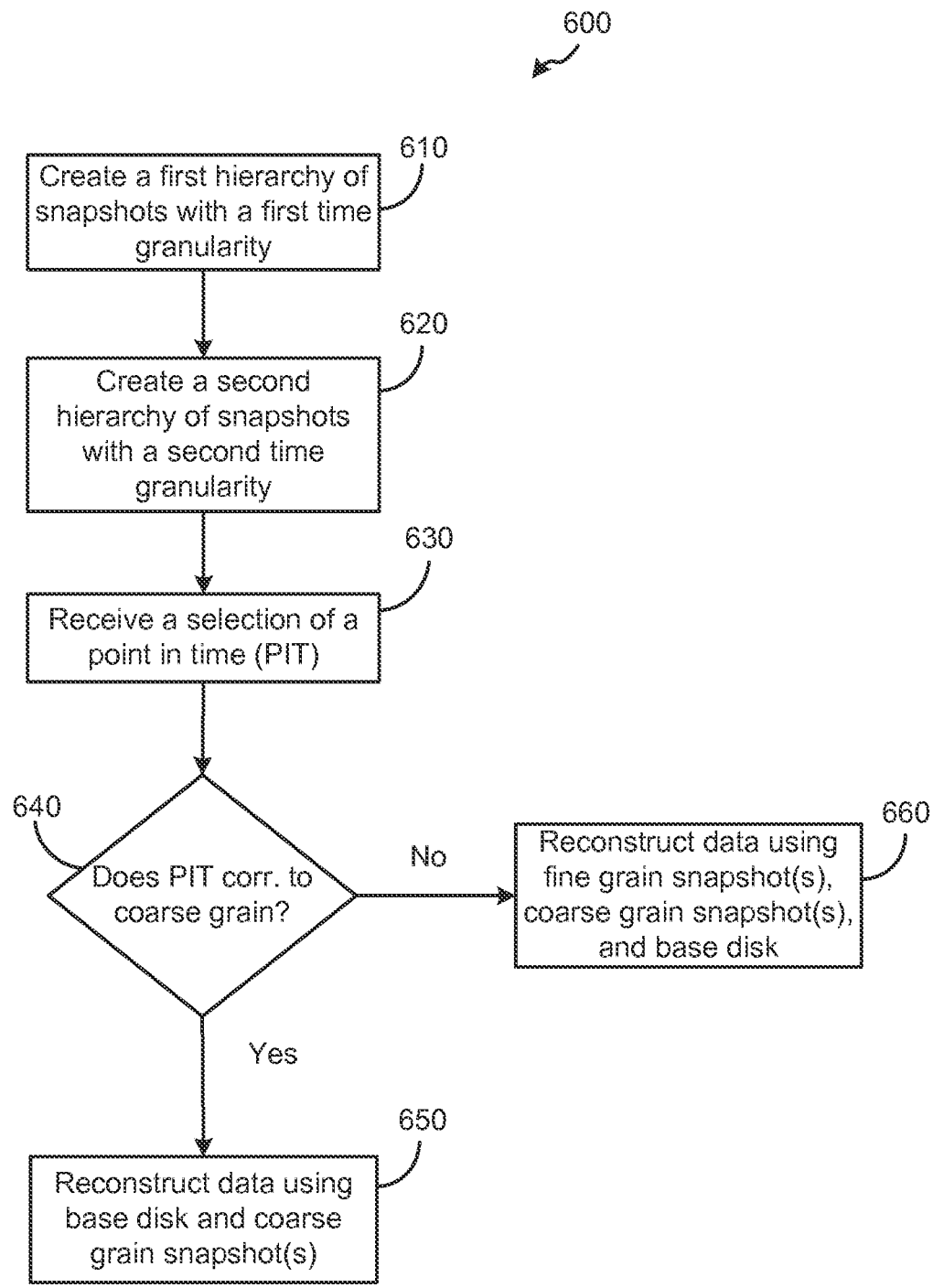
FIG. 6 is a flow diagram that illustrates a method of recovering a virtual machine.

FIG. 6 is flow diagram that illustrates a method of recovering a virtual machine. Although the method steps are described in conjunction with the systems of FIGS. 1-2 and 4-5, persons skilled in the art will understand that any system configured to perform the method steps, in any order, falls within the scope of the present invention. In some alternative implementations, the functions noted in the steps may occur out of the order noted in the figures. For example, two steps shown in succession may, in fact, be executed substantially concurrently, or the steps may sometimes be executed in the reverse order, depending upon the functionality involved. In various embodiments, snapshots may be taken of virtual disks, storage objects, data volumes, file systems, files, and the like. The method 600 begins at step 610 by creating a first hierarchy of snapshots with a first time granularity. This first hierarchy is the coarsest grain hierarchy of snapshots. The first hierarchy is also associated with a base disk. In one embodiment, the coarsest grain hierarchy snapshots are created every 30 minutes. The first hierarchy is populated with snapshots one at a time, at the specific points-in-time corresponding to the first time granularity.

The method continues at step 620 by creating a second hierarchy of snapshots with a second time granularity. The second time granularity is an integer ratio of the first time granularity. For example, for every coarsest grain snapshot, there may be two snapshots created for the second time granularity. The second hierarchy is also populated with snapshots one at a time, at the specific points-in-time corresponding to the second time granularity. The first and second hierarchies may be stored locally, remotely, or as a combination of local and remote copies.

The number of hierarchies may be selected at any point in time, such as when a user first configures replication. That is, steps 610 and 620 may occur at substantially the same time. In other embodiments, step 620 might occur at a time when a user decides to increase the number of retained snapshots and wants to balance this increase with adding a hierarchy to achieve reasonable read latencies on a recovery.

At step 630, a selection of a point-in-time is received. A user may want to recreate a VM at this specific point-in-time in the past. Replication may occur for any length of time before a user decides to recover a VM to a specific point-in-time in the past. In some embodiments, a file or files may be retrieved and/or recreated instead of a VM.

At step 640, the method determines whether the point-in-time corresponds to a coarse grain snapshot. If it does, the method proceeds to step 650, where data is reconstructed using the base disk and the changes corresponding to at least one coarse grain snapshot. As an example, if the user had chosen a point-in-time of t=60 minutes, that time corresponds to the second coarse grain snapshot (because coarse grain snapshots are taken every 30 minutes in this example). The VM can be recreated using the base disk and the first and second coarse grain snapshots; none of the snapshots in the second hierarchy are necessary in this example.

If, in step 640, the point-in-time does not correspond to a coarse grain snapshot, the method proceeds to step 660, where the VM is recreated using the fine grain snapshot corresponding to the point-in-time, along with any intervening fine grain snapshots down to the point-in-time of the nearest coarse grain snapshot, plus any intervening coarse grain snapshots, plus the base disk. As an example of how a VM is recreated using a fine grain snapshot, see FIGS. 5A and 5B above.

Snapshots can be created using a variety of techniques. The snapshots can comprise delta disks, or redo logs, which track the changes that have occurred in the VM since the time of the previous snapshot. After a snapshot is taken of a VM state by a snapshot module, a replication unit creates a new delta disk in the fine grain snapshot hierarchy and copies the changed data into the delta disk. In one embodiment, the replication unit also copies these changes into an active delta disk in each coarser-grain hierarchy, creating a new delta disk in each hierarchy as needed per the predefined ratio of hierarchies. Any type of snapshot mechanism may be used, as long as the mechanism allows for extraction of blocks written since the last snapshot.

For example, if four fine grain delta disks map onto one middle grain delta disk, and four middle grain delta disks map onto one coarse grain delta disk, a new coarse grain delta disk is created for every 16 fine grain snapshots. Writing all hierarchies at the same time avoids the need to read data after it has been written, but this approach has the cost of possibly writing the same extent multiple times in the middle grain and coarse grain hierarchies.

Another approach is to complete four fine grain delta disk updates and then copy the unique data from these four delta disks into the corresponding middle grain delta disk. Alternatively, the system could wait for more than one finer grain snapshot to complete and then copy the unique data from this number of snapshots to the higher granularity hierarchies. Another alternative is for the system to track whether a lot of overwriting is being done, and if so, switch from concurrent writing to delayed writing of the higher granularity hierarchies. A user may instruct the system to use a preferred technique, or the system may intelligently choose the appropriate technique based on certain criteria (such as speed, efficiency, reducing overwrites, etc.).

A system can transition from N hierarchies to N+1 hierarchies and back again to N according to one embodiment. In this embodiment, each successive added hierarchy has more snapshots. The number of snapshots in hierarchy N is denoted by $N_{SNAP}$, and the number of snapshots in hierarchy N+1 is denoted by $N+1_{SNAP}$. In this example, hierarchy 1 has an associated base disk, and the snapshot ratio is three fine grain snapshots for each coarse grain snapshot (the snapshot ratio $(N+1_{SNAP})/N_{SNAP}=M$, where M=3 in this embodiment).

Figure 7:
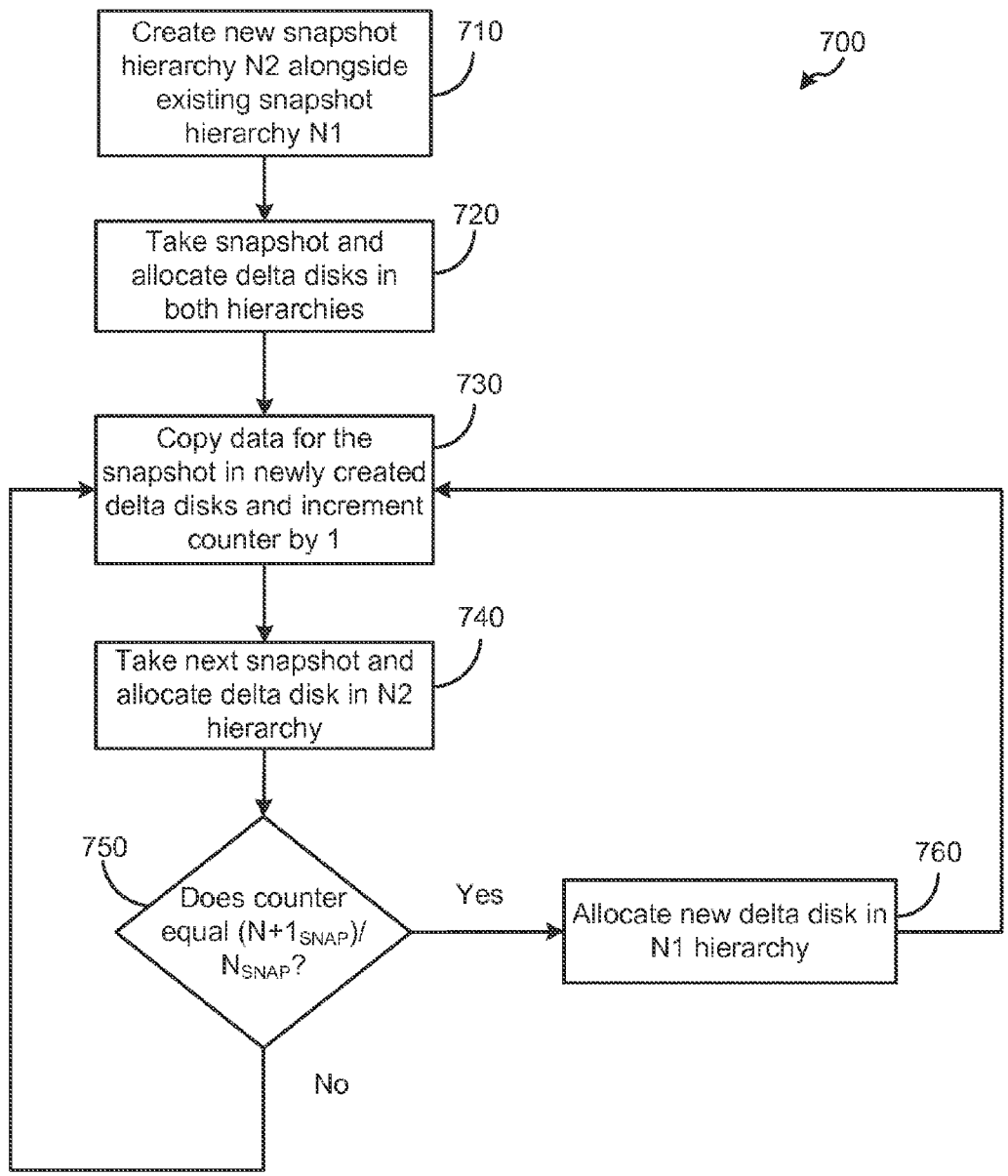
FIG. 7 is a flow diagram that illustrates a method of transitioning hierarchies.

FIG. 7 is flow diagram that illustrates a method of transitioning hierarchies. As a starting point, assume that a system of hierarchies contains a first snapshot hierarchy N1. The method 700 begins at step 710 by creating a new snapshot hierarchy N2 alongside existing snapshot hierarchy N1. At step 720, when the first VM snapshot is taken after creating the new hierarchy N2, a snapshot (i.e., delta disk) is allocated in both hierarchies N1 and N2. At step 730, the data for the snapshot is copied into any newly created delta disk in either hierarchy and a counter is incremented by 1.

At step 740, the next VM snapshot is taken. A delta disk is allocated in the N2 hierarchy at this step, because N2 is the fine grain hierarchy in the system. Because N2 is the finest grain hierarchy in this example, a delta disk will be allocated for N2 each time a snapshot is taken. At step 750, the method determines if the counter equals M (three, in this example). If the counter equals M (i.e., $(N+1_{SNAP})/N_{SNAP}$), a new delta disk is allocated in the N1 hierarchy (the coarse grain hierarchy) at step 760. The process then returns to step 730, where data is copied into the newly created delta disks of each hierarchy, which were created in steps 740 and 760 in this iteration of the method. The process then proceeds to step 740 in preparation for the next snapshot.

If the counter does not equal M in step 750, the process returns to step 730, where data is copied into newly created delta disks and the counter is again incremented. In this iteration, the data is copied only to the delta disk in the N2 hierarchy created in the previous step 740, because this is the only newly created delta disk. The process then proceeds again to step 750.

In one embodiment, a new hierarchy is created based on a user policy that defines the number of snapshots to retain for the VM. If the retention policy would retain more than this number, an additional hierarchy is defined.

If the policy later changes such that the number of snapshots to be retained is below the user-specified value, the system retires the most fine grain snapshot series. This process is the reverse of the process outlined in FIG. 7 above. Suppose the snapshot series has hierarchies N1, N2, and N3. If N3 is no longer required, when the next snapshot is taken, a new snapshot is allocated in series N2 and N1. The changes are written into N2 and into N1, and the process continues. Each time a snapshot is taken, a new one is allocated into N2 and, if needed, a snapshot is created in N1.

If the hierarchy N1 already has the maximum number of snapshots prior to the above process, then the number of snapshots must be reduced by merging older N1 snapshots. Snapshots can be pruned as new instances are collected, as discussed in further detail below.

Retention policies and pruning are used to collapse snapshots to limit their number, otherwise known as rebalancing. In addition, pruning may be performed to achieve a target balance of space usage versus a recovery time objective (RTO). Example retention policies include retaining the last X number of fine-grain snapshots or retaining X daily snapshots for the last D days. The former policy allows for simple pruning algorithms, but is less flexible. More complex policies require additional logic because they can generate "holes" in the snapshot hierarchies and require rebalancing of the coarser grain hierarchies. Note that retention policies are expressed in terms of the fine grain snapshots since there is a 1:1 correspondence between these and the snapshots taken of the running VM.

For the simple pruning policy, a number of variants are possible. Two algorithms are presented herein. Consider the three hierarchies of snapshots as illustrated in FIG. 2. In the simplest embodiment, each time a fine grain snapshot is deleted, its changes are merged into the base disk. Then, a check is performed to see if any of the coarser grain snapshots no longer have any corresponding fine grain snapshots. If they do not, those coarser grain snapshots are deleted.

For the example hierarchies illustrated in FIG. 2, a simple pruning algorithm can be employed. First, merge fine grain snapshot 1 into the base disk and then delete the snapshot. Then, perform the same merge-and-delete step with snapshots 2 and 3. After those three snapshots are deleted, middle grain snapshot 1 can be deleted since it no longer has any corresponding fine grain snapshots. The algorithm can continue by merging and deleting fine grain snapshots 4, 5, and 6. After those three snapshots are deleted, middle grain snapshot 2 can be deleted since it now has no more corresponding fine grain snapshots. In addition, coarse grain snapshot 1 can now be deleted since it also has no more corresponding fine grain snapshots.

One disadvantage to the simple algorithm above is that the algorithm may copy the same extent multiple times into the base disk. An alternative method can avoid this redundant copying by delaying the deletion of snapshots. First, the algorithm locates the oldest still live fine grain snapshot and marks it dead. For example, mark fine grain 1, then fine grain 2, then fine grain 3 snapshots dead. A dead snapshot can still be used during recovery but it is no longer offered to the user as a recovery point-in-time.

Next, the algorithm determines if all the snapshots contained within the oldest middle grain snapshots are dead. If they are, the fine grain snapshots are deleted. For example, if fine grain snapshots 1, 2, and 3 are dead, all three can be deleted. The middle grain snapshot 1 can then be marked dead.

These steps are then repeated for the middle and upper grain hierarchies. When middle grain snapshots 1 and 2 are marked dead, the algorithm determines that coarsest grain snapshot 1 dead, and merges its changes into the base disk. When the coarsest grain snapshot is deleted, the middle grain snapshots that correspond to it are also deleted.

With such a retention policy, a further optimization is that a snapshot for a level N (such as fine grain snapshot 6) does not need to be retained since the updates in it are also contained within the next higher level snapshot (middle grain snapshot in the example of FIG. 2). If a user were to choose a point-in-time for recovery corresponding to fine grain snapshot 6, middle grain snapshot 2 could be used instead. Therefore, fine grain snapshot 6 is unnecessary. The algorithm could be applied recursively resulting in the pruning of middle grain snapshot 2 as well (because all changes in middle grain snapshot 2 are encompassed in coarsest grain snapshot 1). This optimization can be applied at the time the snapshot hierarchies are created if the retention policy is known.

Figure 8:
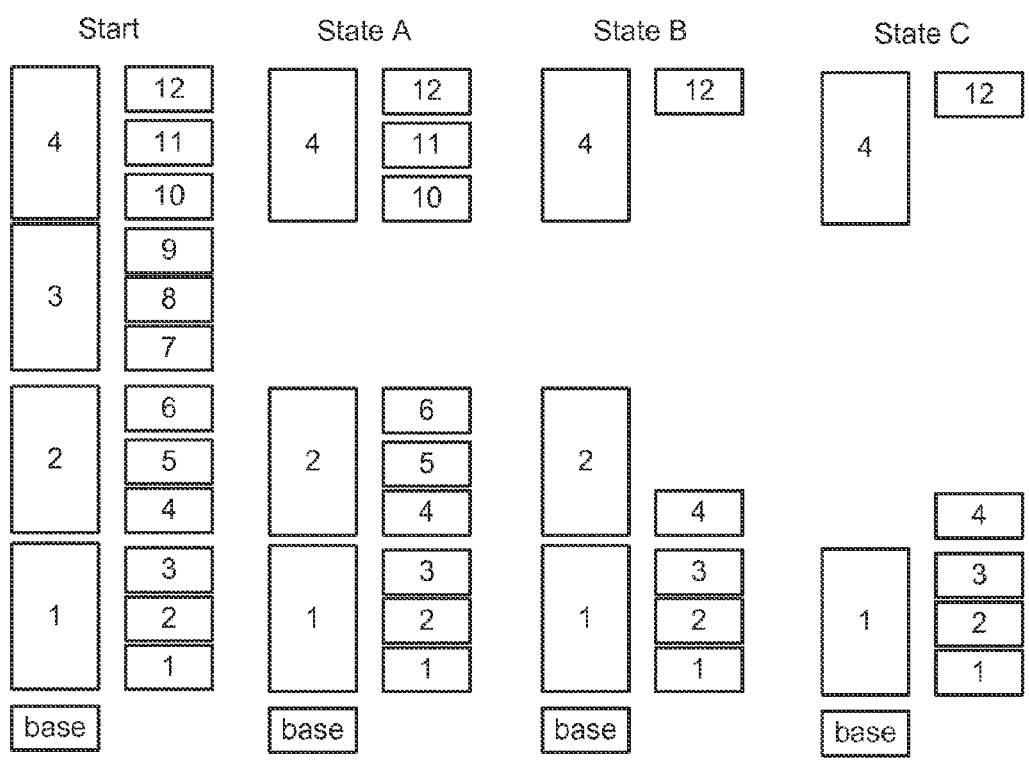
FIG. 8 illustrates snapshot hierarchies at various steps in a pruning process.

With a more general policy that leaves "holes" in the snapshot hierarchy, another algorithm is required, as illustrated in FIG. 8. FIG. 8 illustrates the snapshot hierarchies at various steps in a pruning process utilizing this algorithm. In FIG. 8, fine grain hierarchy has three snapshot for every snapshot in the coarse grain hierarchy. To begin, assume that fine grain snapshot 7 is selected to be pruned. Snapshot 7's changes are written into snapshot 8. Further prunes could result in 8 merging into 9, and 9 merging into 10. At this point, coarse grain snapshot 3 is no longer required. Coarse grain snapshot 3 is merged into coarse grain snapshot 4. The resulting state is illustrated as "State A."

After further prunes (fine grain snapshots 5, 6, 10, and 11 merged into 12), the snapshot hierarchies may appear as "State B." At this time, the ratio of fine grain to coarse grain snapshots is 5:3, which the algorithm deems too small in this example. So, coarse grain snapshot 2 is merged into fine grain snapshot 12, allowing coarse grain snapshot 2 to be deleted, which is shown as "State C" in FIG. 8. In an alternative embodiment, fine grain snapshot 12 is merged into coarse grain snapshot 2, and then this new snapshot is moved to the fine grain hierarchy and substituted for the existing snapshot 12.

One advantage of the above described embodiments is that read latency can be reduced or minimized using multiple hierarchies. The different granularity of the snapshot hierarchies reduces the number of layers to traverse to satisfy reads. Satisfying reads using the multitude of hierarchies can reduce fragmentation in address-translation maps. In addition, granularity ratios between the hierarchies and the depth of each hierarchy can be tuned to trade off RTO for the number of points in time, overhead in IO, and/or storage footprint.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A non-transitory computer readable medium comprising instructions that are executed in a computer system to carry out a method of restoring a data volume using incremental snapshots of the data volume, said method comprising:
   creating a first series of incremental snapshots according to a first predefined interval;
   creating a second series of incremental snapshots according to a second predefined interval, wherein the second predefined interval is different from the first predefined interval, and wherein the second predefined interval that is an integer multiple of the first predefined interval;
receiving a request to restore the data volume to a point-in-time; and
restoring the data volume to the point-in-time using none or some of the snapshots in the first series that were created at or prior to the point-in-time, and all of the snapshots in the second series that were created at or prior to the point-in-time.

2. The non-transitory computer-readable medium of claim 1, wherein the method further comprises creating a snapshot of a base image of the data volume, and the base image is also used to restore the data volume to the point-in-time.

3. The non-transitory computer-readable medium of claim 2, wherein a first of the snapshots in the first series was created after the first predefined interval after the snapshot of the base image of the data volume was created and a first of the snapshots in the second series was created after the second predefined interval after the snapshot of the base image of the data volume was created.

4. The non-transitory computer-readable medium of claim 3, wherein if the point-in-time is aligned with a time when one of the snapshots in the second series was created, restoring the data volume to the point-in-time using none of the snapshots in the first series.

5. The non-transitory computer-readable medium of claim 3, wherein if the point-in-time is aligned with a time when one of the snapshots in the first series was created but not with a time when one of the snapshots in the second series was created, restoring the data volume to the point-in-time using the snapshots in the first series that were created at or prior to the point-in-time and after the time of creating the most recent one of the snapshots in the second series that were created at or prior to the point-in-time.

6. The non-transitory computer-readable medium of claim 5, wherein restoring the data volume to the point-in-time comprises:
creating a redo log for accepting write operations;
copying contents of the snapshots in the first series that were created at or prior to the point-in-time and after the time of creating the most recent one of the snapshots in the second series that were created at or prior to the point-in-time; and
directing read operations first to the redo log and then in time order, from most recent to least recent, to each of the snapshots in the second series that were created at or prior to the point-in-time, and then to the base image of the data volume.

7. The non-transitory computer-readable medium of claim 5, wherein restoring the data volume to the point-in-time comprises:
creating a redo log for accepting write operations; and
directing read operations first to the redo log and then in time order, from most recent to least recent, to each of the snapshots in the first series that were created at or prior to the point-in-time and after the time of creating the most recent one of the snapshots in the second series that were created at or prior to the point-in-time, and then to the snapshots in the second series that were created at or prior to the point-in-time, and then to the base image of the data volume.

8. The non-transitory computer-readable medium of claim 1, further comprising pruning one or more snapshots in the first series of snapshots, and merging one or more changes associated with the pruned one or more snapshots into another snapshot in either the first or second series of snapshots.

9. The non-transitory computer-readable medium of claim 8, further comprising pruning a snapshot in the second series of snapshots because it no longer has any corresponding snapshots in the first series of snapshots.

10. The non-transitory computer-readable medium of claim 1, further comprising:
creating a third series of incremental snapshots according to a third predefined interval that is an integer multiple or an integer divisor of the first predefined interval; and
restoring the data volume to the point-in-time using none or some of the snapshots in the third series that were created at or prior to the point-in-time.

11. A method for restoring a data volume using incremental snapshots of the data volume, said method comprising:
creating a first series of incremental snapshots according to a first predefined interval;
creating a second series of incremental snapshots according to a second predefined interval, wherein the second predefined interval is different from the first predefined interval, and wherein the second predefined interval is an integer multiple of the first predefined interval;
receiving a request to restore the data volume to a point-in-time; and
restoring the data volume to the point-in-time using none or some of the snapshots in the first series that were created at or prior to the point-in-time, and all of the snapshots in the second series that were created at or prior to the point-in-time.

12. The method of claim 11, further comprising:
creating a snapshot of a base image of the data volume, wherein the base image is also used to restore the data volume to the point-in-time.

13. The method of claim 11, wherein a first of the snapshots in the first series was created after the first predefined interval after the snapshot of the base image of the data volume was created and a first of the snapshots in the second series was created after the second predefined interval after the snapshot of the base image of the data volume was created.

14. The method of claim 13, wherein if the point-in-time is aligned with a time when one of the snapshots in the first series was created but not with a point-in-time when one of the snapshots in the second series was created, restoring the data volume to the point-in-time using the snapshots in the first series that were created at or prior to the point-in-time and after the time of creating the most recent one of the snapshots in the second series that were created at or prior to the point-in-time.

15. The method of claim 14, wherein restoring the data volume to the point-in-time comprises:
creating a redo log for accepting write operations;
copying contents of the snapshots in the first series that were created at or prior to the point-in-time and after the time of creating the most recent one of the snapshots in the second series that were created at or prior to the point-in-time; and
directing read operations first to the redo log and then in time order, from most recent to least recent, to each of the snapshots in the second series that were created at or prior to the point-in-time, and then to the base image of the data volume.

16. An apparatus, comprising:
a processing unit; and
a memory coupled to the processing unit, the memory storing instructions which, when executed by the processing unit, cause the processing unit to:
create a first series of incremental snapshots of a data volume according to a first predefined interval;
create a second series of incremental snapshots of the data volume according to a second predefined interval, wherein the second predefined interval is different from the first predefined interval, and wherein the second predefined interval is an integer multiple of the first predefined interval;
receive a request to restore the data volume to a point-in-time; and
restore the data volume to the point-in-time using none or some of the snapshots in the first series that were created at or prior to the point-in-time, and all of the snapshots in the second series that were created at or prior to the point-in-time.

17. The apparatus of claim 16, wherein the instructions further cause the processing unit to create a snapshot of a base image of the data volume, wherein the base image is also used to restore the data volume to the point-in-time.

18. The apparatus of claim 16, wherein a first of the snapshots in the first series was created after the first predefined interval after the snapshot of the base image of the data volume was created and a first of the snapshots in the second series was created after the second predefined interval after the snapshot of the base image of the data volume was created.

19. The apparatus of claim 18, wherein if the point-in-time is aligned with a time when one of the snapshots in the first series was created but not with a point-in-time when one of the snapshots in the second series was created, restoring the data volume to the point-in-time using the snapshots in the first series that were created at or prior to the point-in-time and after the time of creating the most recent one of the snapshots in the second series that were created at or prior to the point-in-time.

20. The apparatus of claim 19, wherein, to restore the data volume to the point-in-time, the instructions further causing the processing unit to:
create a redo log for accepting write operations;
copy contents of the snapshots in the first series that were created at or prior to the point-in-time and after the time of creating the most recent one of the snapshots in the second series that were created at or prior to the point-in-time; and
direct read operations first to the redo log and then in time order, from most recent to least recent, to each of the snapshots in the second series that were created at or prior to the point-in-time, and then to the base image of the data volume.

* * * * *